US010529002B2

(12) United States Patent
Parameshwara et al.

(10) Patent No.: US 10,529,002 B2
(45) Date of Patent: Jan. 7, 2020

(54) CLASSIFICATION OF VISITOR INTENT AND MODIFICATION OF WEBSITE FEATURES BASED UPON CLASSIFIED INTENT

(71) Applicant: Dell Products L.P., Round Rock, TX (US)

(72) Inventors: Amith Parameshwara, Sagar (IN); Nisanth Pettikkattil Sudhakaran, Bangalore (IN); Lukas Cerveny, Bratislava (SK); Shruti Sangal, Ghaziabad (IN)

(73) Assignee: Dell Products L.P., Round Rock, TX (US)

( * ) Notice: Subject to any disclaimer, the term of this patent is extended or adjusted under 35 U.S.C. 154(b) by 277 days.

(21) Appl. No.: 15/654,864

(22) Filed: Jul. 20, 2017

(65) Prior Publication Data

US 2019/0026814 A1 Jan. 24, 2019

(51) Int. Cl.
*G06F 17/30* (2006.01)
*G06Q 30/06* (2012.01)
*G06K 9/62* (2006.01)
*G06F 16/9535* (2019.01)

(52) U.S. Cl.
CPC ..... *G06Q 30/0631* (2013.01); *G06F 16/9535* (2019.01); *G06K 9/6221* (2013.01); *G06K 9/6224* (2013.01); *G06K 9/6234* (2013.01)

(58) Field of Classification Search
CPC ............ G06Q 30/0631; G06F 16/9535; G06K 9/6221
USPC .................................................. 707/600–899
See application file for complete search history.

(56) References Cited

U.S. PATENT DOCUMENTS

| 2004/0189696 | A1* | 9/2004 | Shirriff | ................. | G06F 16/957 715/738 |
| 2015/0112995 | A1* | 4/2015 | Elyada | ................... | H04W 4/21 707/738 |

OTHER PUBLICATIONS

Gadi Benmark et al., Cracking the digital-shopper genome, McKinsey & Company, printed Mar. 10, 2017, http://www.mckinsey.com/business-functions/marketing-and-sales/our-insights/cracking-the-digital-shopper-genome.

* cited by examiner

*Primary Examiner* — Isaac M Woo
(74) *Attorney, Agent, or Firm* — Terrile, Cannatti & Chambers; Stephen A. Terrile

(57) ABSTRACT

A system, method, and computer-readable medium are disclosed for monitoring access to a website by a user across a plurality of visits to the website; identifying an intent of a user for each of the plurality of visits to the website; and, modifying the website for each of the plurality of visits to the website based upon the intent of the user.

18 Claims, 7 Drawing Sheets

CLASSIFICATION OF VISITOR INTENT AND MODIFICATION OF WEBSITE FEATURES BASED UPON CLASSIFIED INTENT

BACKGROUND OF THE INVENTION

Field of the Invention

The present invention relates to information handling systems. More specifically, embodiments of the invention relate to modifying website features based upon classified intent.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to access a website via a web browser executing on the information handling system. It is known that the website may be executed on a web server which is remote to the information handling system executing the web browser.

It is known to identify and/or predict visitor intent online such as when a visitor accesses an ecommerce type website. Certain known techniques identify and/or predict the intent and then personalize a visitor experience on website via various personalization methods such as targeted offers, personalized product showcase, personalized website navigation.

SUMMARY OF THE INVENTION

A system, method, and computer-readable medium are disclosed for performing website customization operation comprising monitoring access to a website by a user across a plurality of visits to the website; identifying an intent of a user for each of the plurality of visits to the website; and, modifying the website for each of the plurality of visits to the website based upon the intent of the user. In certain embodiments, the website customization operation includes either or both of an intent classification operation and a website modification operation.

More specifically, in certain embodiments, the website customization operation includes performing a machine learning operation. In certain embodiments, the machine learning operation includes one or more of a clustering operation which identifies groups of visits with similar behavior, a profiling operation which profiles characteristics of each of the identified groups, an intent identification operation which hypothesizes an intent based on the profiled characteristics and an analysis operation which analyzes each intent cluster (i.e., each clustered group) and to generates recommendations intended to better satisfy the identified intents.

In certain embodiments, the website customization operation includes a term frequency-inverse document frequency TF/IDF transformation operation which discounts the importance of frequently occurring feature values. Performing the TF IDF transformation operation avoids certain clustering abnormalities around some most frequent values. In certain embodiments, the website customization operation includes a topic selection operation which selects an optimal number of Latent Dirichlet Analysis (LDA) topics (i.e., topics identified via an LDA operation) based on minimizing perplexity on a held out set (i.e., a measure of how well a training set predicts an intent). The topic selection operation increases the speed and efficiency of website customization operation by limiting performance of the machine learning operation around a set of models which will likely generate optimal values. In certain embodiments, the website customization operation uses auto encoders and/or other embedding techniques, to further improve the machine learning operation to capture complex relations within combinations of intents.

In certain embodiments, the website customization operation incorporates intent into search logic used within a website to optimize and/or inform the website search. In certain embodiments, the website customization operation deploys an intent classifier (i.e., an intent identifier) to the website which enables the website to be customized as a customer navigates the website. In certain embodiments, identified intent information is passed along with a customer query when the customer searches the website. Providing the identified intent information allows the customized website to provide targeted search results which are linked to customer intent. In certain embodiments, the website customization operation provides an intent module which can reside online and update and customize the website during a customer visit. In certain embodiments, the customized website includes pages which contain a recommendation module and other personalization features which account for customer intent and enable the customized website to be tailored to a particular customer's needs. In certain embodiments, the website customization operation modifies website content (e.g., content, tools, navigation, etc.) based upon understanding of behavior, needs, preferences and frustrations of visitors of visitors for various intents.

Such a website customization operation provides a robust approach to customizing a website which is less dependent on domain knowledge and feature and/or variable engendering.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
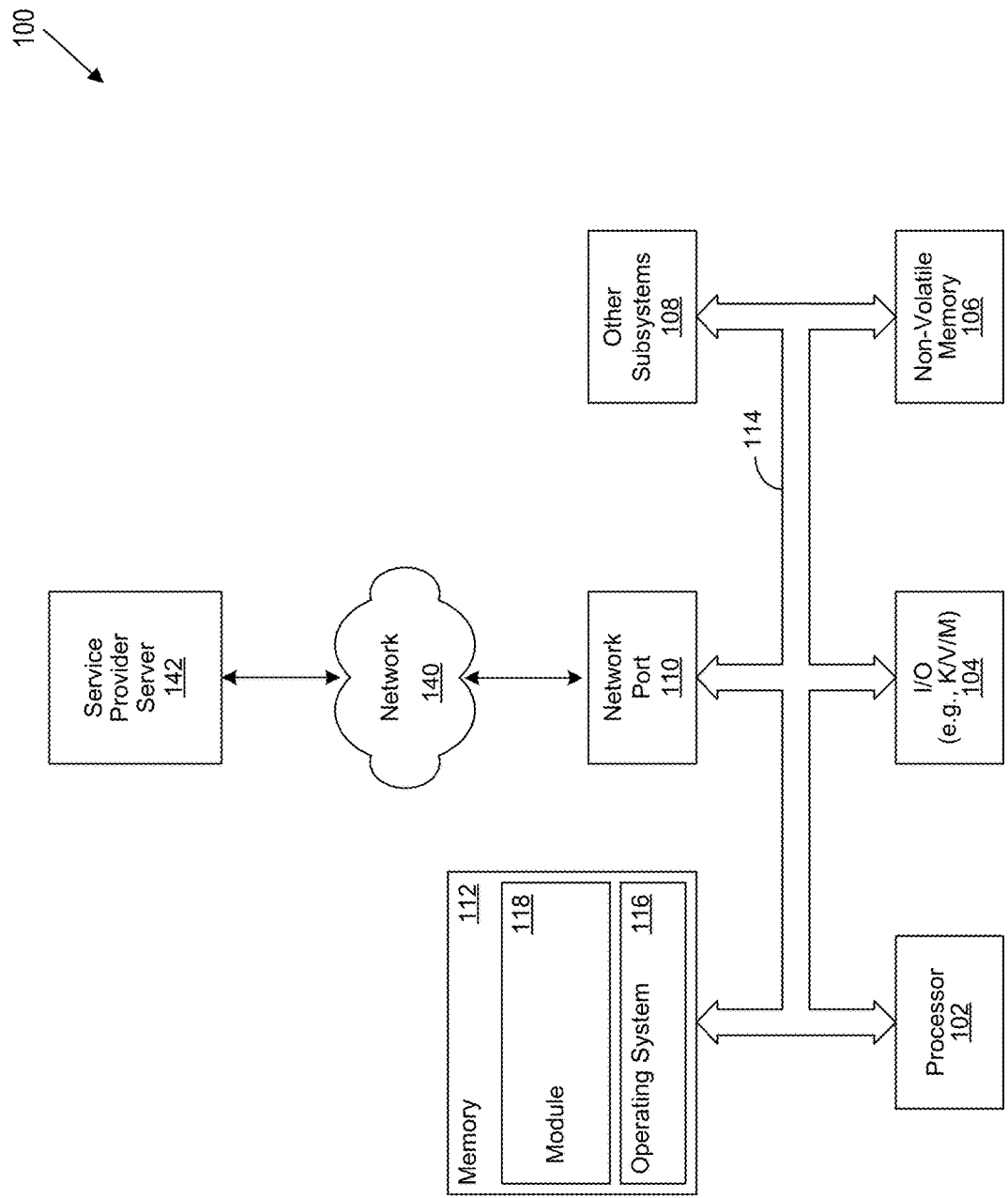
FIG. 1 shows a general illustration of components of an information handling system as implemented in the system and method of the present invention.

Various aspects of the present disclosure include an appreciation that it would be desirable to obtain a deeper understanding of customers, their requirements, behavior, problems and needs. Such an understanding can be especially important for a retail organization. Various aspects of the present disclosure include an appreciation that ecommerce type organizations can have an advantage when obtaining such an understanding because of availability of more and intricate customer data. Various aspects of the present disclosure include an appreciation that online visitors to an eCommerce type website often visit the website multiple times before completing a purchase. Each such visit can involve different intents that the visitor wants to accomplish in the visit, finally culminating in an outcome (such as a purchase or content download, registration, subscription and so on) set by the organization. For instance, a customer wanting to purchase a laptop might visit a supplier website first with the intent of exploring different laptop families offered by the supplier, visits again after a few days with the intent of obtaining more information regarding a particular laptop series and visits again with the intent of checkout. While organizations recognize that a customer purchase journey can involve multiple visits with different intents, identifying different intents and more importantly mapping intents to visits can be challenging.

Various aspects of the present disclosure include an appreciation that it is desirable to provide study of visit data (perhaps visit data which is offline relative to actual interaction with the website) to identify visit intent based on visitor behavior during the visit, identify problems faced by visitors in satisfying those intents, and use these insights for customizing a website based upon identified intent.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a website customization system 118.

The website customization system 118 performs a website customization operation. The website customization operation improves processor efficiency (and thus the efficiency of the information handling system 100) by of automatically customizing a website based upon an intent of a user accessing the website.

As will be appreciated, once the information handling system 100 is configured to perform the website customization operation, the information handling system 100 becomes a specialized computing device specifically configured to perform the website customization operation and is not a general purpose computing device. Moreover, the implementation of the website operation on the information handling system 100 improves the functionality of the information handling system and provides a useful and concrete result of automatically customizing a website based upon an intent of a user accessing the website.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Figure 2:
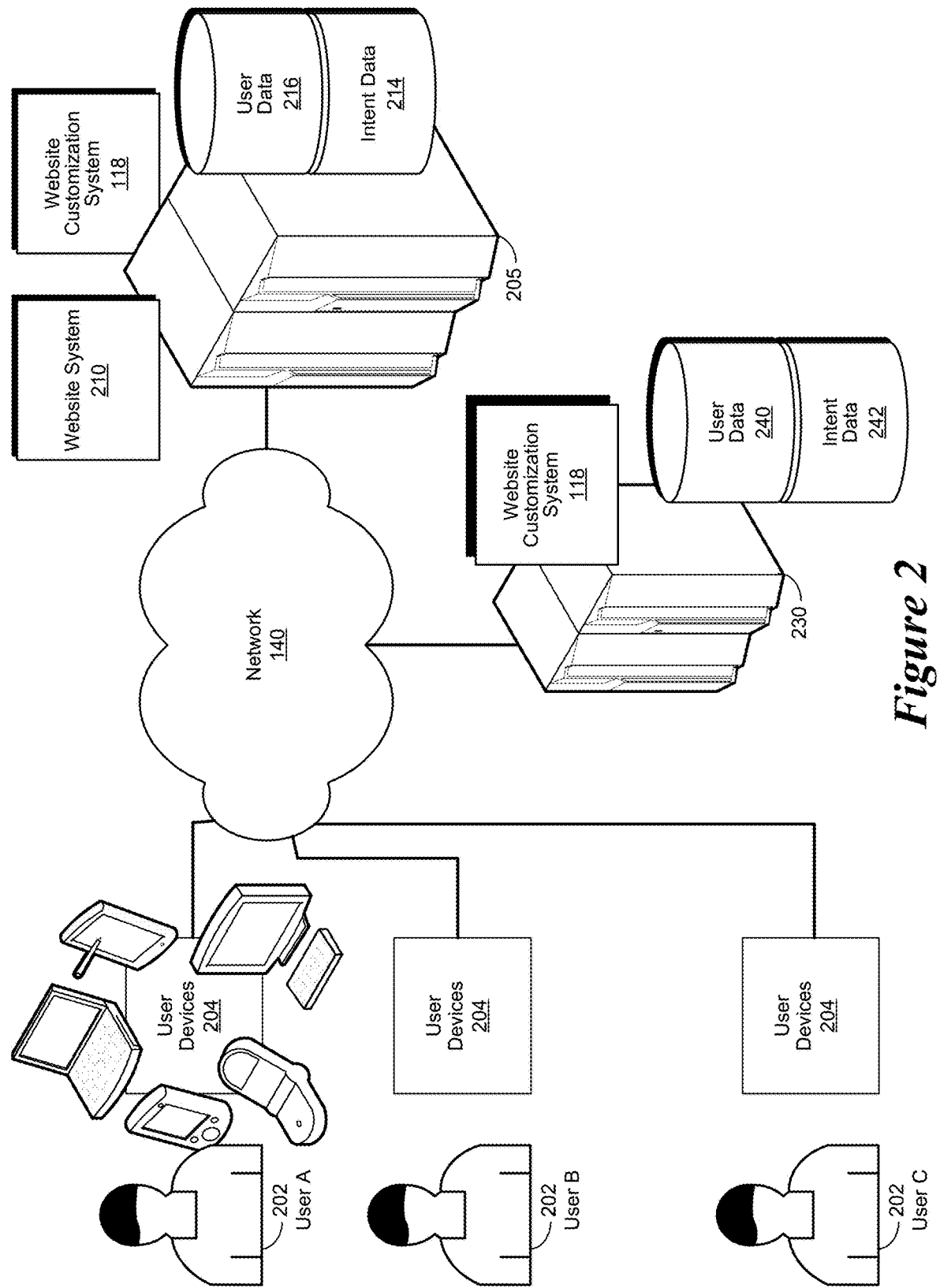
FIG. 2 shows a block diagram of website customization environment.

FIG. 2 is a block diagram of a website customization environment 200 implemented in accordance with an embodiment of the invention. In various embodiments, users 202 (user A, user B, user C) access a website executing on a web server 205. In various embodiments, a web system 210 executes on a hardware processor of the web server 2015 to provide the website. In these and other embodiments, the user 202 may use a user device 204 to access the website. In various embodiments, the website is customized via the website customization system 118 based upon an intent of the user 202 accessing the website.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device 204 is used to exchange information between the user 202 and the web server 200 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, a website customization system 118 is implemented on an information handling system (such as the web server 205) to perform a website customization operation. In various embodiments the information handling system 205 may include repositories of user data 212 and intent data 214. In certain embodiments, the user data 212 is stored as variables relating to the user access to the website. In these various embodiments, the network 140 is used by the website customization system 118 to monitor user interactions with a website and to store information regarding the user interactions with the website.

In certain embodiments, the information regarding user interactions with the website is stored off line (i.e., remotely with reference to the web server 205). In certain embodiments, the information is stored within customization server 230. In certain embodiments, the information is stored within a user data repository 240 as well as an intent data 242 accessed via the customization server information handling system 230. In certain embodiments, the information regarding user interactions with the website is obtained via a data capture operation. In certain embodiments, the data capture operation is performed using a data tool such as the Adobe Site Catalyst data tool or the Google analytics data tool.

In certain embodiments, the website customization system 118 identifies raw input variables. In certain embodiments, the raw input variables include visit level variables which are defined to help identify customer intent. In certain embodiments, the information regarding user interactions includes the raw input variables. In certain embodiments, the variables include one or more of layer variables, navigational method variables, navigational type variables, navigational flow variables, duration variables, product category variables and visitor profile variables. In certain embodiments, layer variables, navigational method variables, navigational type variables, navigational flow variables, duration variables, product category variables are used to create intent clusters. In certain embodiments, the visitor profile variables are used to create profile clusters. In certain embodiments, the variables take into account domain knowledge when being defined.

When performing the website customization operation, visits are represented as latent variables. In certain embodiments, when creating clusters of visitor intents, the website customization system 118 embeds visit information into a latent variable space. So doing allows the website customization system 118 to capture potentially non-linear interactions relation between previously defined features. Embedding also helps to represent higher level commonalities between what the customer is attempting to achieve even if the usage patterns are not exactly matching. In certain embodiments, the website customization system 118 uses machine learning techniques when creating the clusters of visitor intents. In certain embodiments, the machine learning operations includes some or all of a Latent Semantic Analysis (LSA) machine learning operation, a (LDA) machine learning operation and/or deep neural network embedding machine learning operations. In certain embodiments, the deep neural network embedding may use de-noising auto encoders or can embed each variable. In various embodiments, the variables are different based on a problem set up.

When representing the visits as latent variables, the variables are pruned and transformed. Additionally, when representing the visits as latent variables, the variables are dimensionality reduced. More specifically, when pruning and transforming the variables, extremes are filtered, collinearity is removed and a term frequency-inverse document frequency (TF/IDF) transformation is performed on the variables. When filtering the extremes, the pruning and transforming removes variable that occur infrequently (with respect to other more relevant variables) or are always present. These variables are filtered because they would have either too little influence on the visit analysis to might skew clusters that are identified. This filtering is similar to removing terms like "a" and "the" from sentences when performing a text mining as the terms have little informational value and are thus not helpful to a text mining operation. When removing collinearity, the pruning and transforming removes (or combines) variables that are redundant. The redundant variables might be variables that are present or absent or changed with the same pattern. Removing the redundant variables is important to the pruning and transforming as keeping these variables might skew the clustering as too much weight might be assigned to the redundant variables. This removal is similar to combining of word phrases in text analytics. In certain embodiments, rather than removing the redundant variables, the multicollinearity removal operation (i.e., an operation where two or more predictor variables in a multiple regression model are highly correlated) could be applied to the variables if the dataset size allows it. When performing a TF/IDF transformation on the variables, the pruning and transforming discounts variables that are present on a relatively large fraction (e.g., greater than 50%) of the visit. Performing the TF/IDF transformation on the variables boosts identification of variables that are only present on a fraction (e.g., less than 25%) and/or subsets of visits. The TF/IDF transformation addresses the issue that when variables or almost always present, these variables do not help in differentiating between topics. Variables that are only sometime present have a higher chance of differentiating the dataset.

When dimensionality reducing the variables, an LDA operation is applied to the variables. The LDA operation reduces a number of input variables from a large amount (e.g., >15,000 variables) to a manageable number of variables (e.g., <100 variables). Performing the LDA operation improves the speed and efficiency of the clustering of visits. Additionally, performing the LDA operation helps the system uncover hidden and/or latent variables that are associated with a visit. The LDA operation expresses each visit as a mix of topics a customer pursued when visiting the website. When performing the LDA operation, the LDA model assumes that clicks in each visit are generated by a mix of latent unobserved topics about which the customer is mindful. Based on the pursued topics customers choose what pages to actuate, how much time to spend on a topic and what product to view. The LDA model assumptions resemble the intents that the system is uncovering. Thus, LDA clusters provide a high correlation to customer intent. When dimensionality reducing, the number of topics are specified as inputs for the LDA operation. In certain embodiments, a theoretical ideal number of topics is determined using perplexity on a held out data set. In certain embodiments, a theoretical ideal number of topics using perplexity of a held out set was determined to be a relatively large number of topics (i.e., a number of topics that is not practical to process within an amount of time that provides results commensurate with the required processing). In certain embodiments, if the theoretical number is deemed to be unrealistic (e.g., the number is too high based upon expectations), then domain knowledge and practicality may be used to determine an ideal number of topics (i.e., a number that is practical based upon expectations). For example, 50 topics might be deemed to be too high, so a smaller number of topics (e.g., 15 topics) is used to identify resulting clusters. In certain embodiments, the LDA operation might be omitted if a number of inputs is low or a cluster formed is deemed acceptable based upon the number of inputs. Alternately, in certain embodiments, a Latent Semantic Analysis (LSA) might be used to dimensionality reduce the variables.

When performing the customization operation, intents are formed by clustering visits. In certain embodiments, when clustering visits, the website customization system 118 applies k-means or other clustering techniques to combine visits with similar behavior into groups. In certain embodiments, the website customization system 188 performs statistical operations to cluster similar visits. In certain embodiments, the statistical operations include one or more of Gap statistics, Average Silulethe method statistics and/or Elbow method statistics to determine an optimal number of intents.

When clustering visits to form intents, the k-means clustering technique enforces a 1 visit to 1 cluster rule. Such a rule eases further analytics on the clusters. In certain embodiments, the clustering groups visits with a similar topic mixture together. In certain embodiments the similarity is based on a distance metric. In certain embodiments, the distance metric uses a Euclid distance analysis. When the statistical operations include a Gap statistic, a theoretically ideal number of clusters (K) is identified. In certain embodiments, additional inspect of the clusters is performed to identify different scenarios close to K. In certain embodiments, when the LDA operation is performed, K equals the number of LDA topics. In certain embodiments, K does not necessarily equal the number of LDA topics. In certain embodiments, the number of clusters may be determined using Gap statistics. In certain embodiments, when using performing the LDA operation, a hard assignment to topic with highest likelihood is performed. However, such an assignment assumes that a topic is equal to an intent, which is not necessarily true, especially with many weak topics. In certain embodiments, the clustering applies a hierarchical clustering. Such a hierarchical clustering enables formation of more versatile clusters and creates a hierarchy of clusters which would enable selection of a number of clusters within the hierarchy. However, hierarchical clustering can be computationally prohibitive with a high volume of samples.

When performing the customization operation, intents are analyzed and profiled. In certain embodiments, the analysis and profiling identifies variables which separate clusters. In certain embodiments, intents are hypothesized based upon the analysis and profiling.

In certain embodiments, the website customization operation uses and defines a broad set of variables to profile and describe visitor intents. These variables don't necessarily need to form a basis of intent but rather can help the website customization operation understand how customers behave. In certain embodiments, the variables used to profile and describe visitor intents include one or more of a bounce rate variable, visitor conversion variables (which indicate whether a conversion occur in the next 1, 2, 3 or more visits to the website). In certain embodiments, the visitor variables can further include one or more of types of web pages used and types of navigation methods across web pages. In certain embodiments, some or all of the variables are obtained from data sources such as customer demographics, geo location, etc. In certain embodiments, some or all of the variables are obtained from Clickstream data.

In certain embodiments, the website customization operation varies variable importance from models trained to identify cluster vs. non-cluster on a broader set of variables. In certain embodiments, the website customization operation applies one or more techniques for identifying intent specific variables. In certain embodiments the techniques include a Random Forest technique, a Boosted Trees technique, etc.

Figure 5:
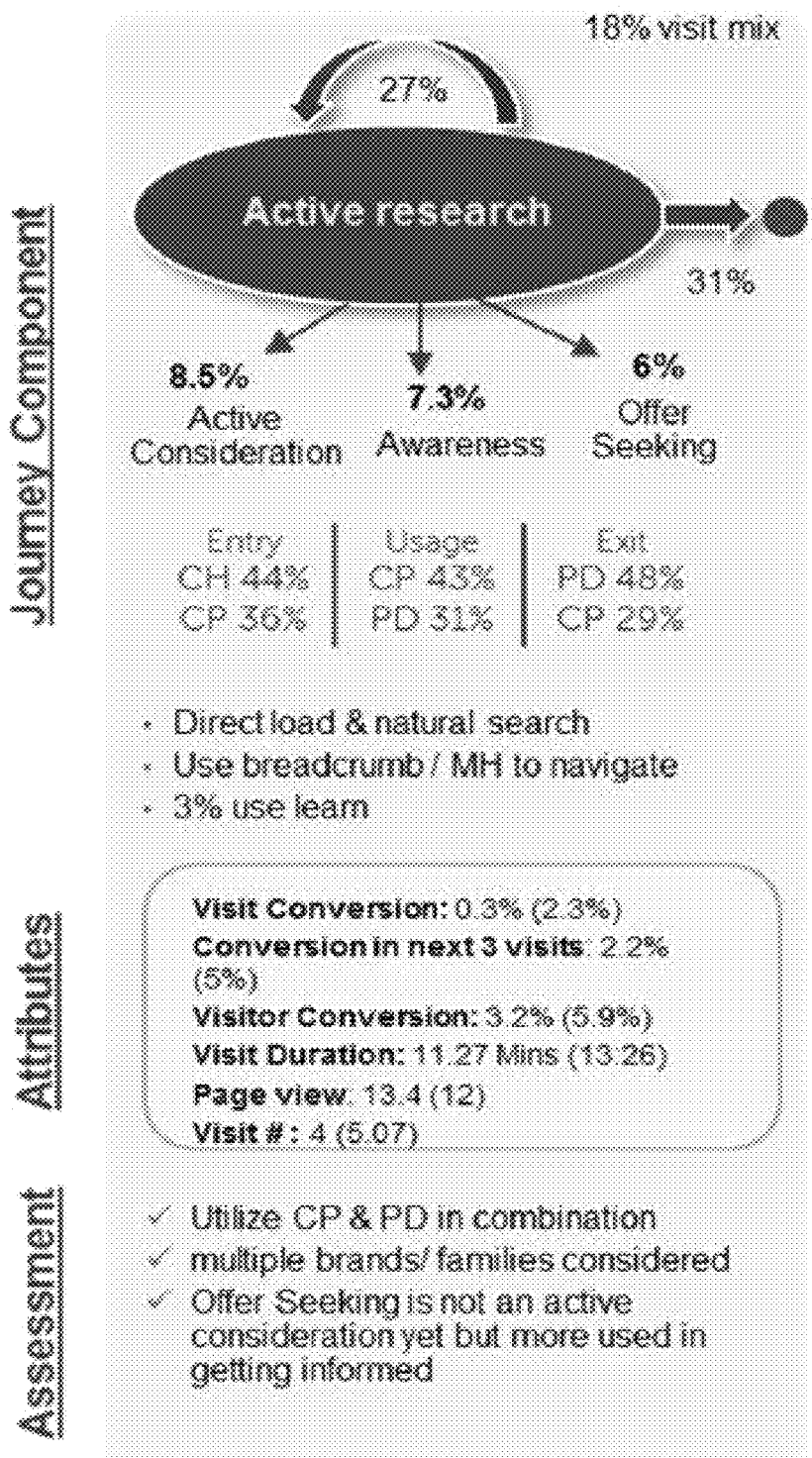
FIG. 5 shows an example of an outcome of profiling and intent hypothesizing from one of the clusters.

FIG. 5 shows an example of an outcome of profiling and intent hypothesizing from one of the clusters.

In certain embodiments, the website customization operation performs a deep dive operation into each intent cluster. When performing the deep dive operation, the website customization operation identifies a success metric for each intent. For example, the success metric might include a purchase completion for checkout intent, a cart addition for product research intent, etc. Using the success metric, the website customization operation segregates all visits to the intent cluster into two sets, a successful visit cluster and an un-successful visit cluster. The website customization operation then identifies website factors that influence success metric. In certain embodiments, the website factors can include navigation factors, tool factor and/or content factors.

In certain embodiments, the website customization operation identifies the website factors by gathering all website factors that define customer experience on site. In certain embodiments, the website factors can include usage of compare tool, errors seen, number of pages visited, number of back clicks, chat usage etc. The website customization operation then applies machine learning operations such as Random Forest to identify variables (and variable importance) that separate the successful visitor intent cluster set and the un-successful visit intent cluster.

In certain embodiments, the website customization operation identifies the website factors by creating a journey of visits in the successful visit set. For the purposes of this disclosure a journey of visits may be defined as a sequence (i.e., an order) of pages accessed by a user when traversing a website. In certain embodiments, the journey includes associated navigation information providing detail on how a user moves from one page to another. This journey of visits may be considered a "Golden Journey" (i.e., a journey of visits which if taken by a visitor increases the chances of success). Additionally, the website customization operation identifies the website factors by creating a journey of visits in un-successful visit set. The website customization operation then analyzes how the un-successful journey differs from the golden journey.

Figure 3:
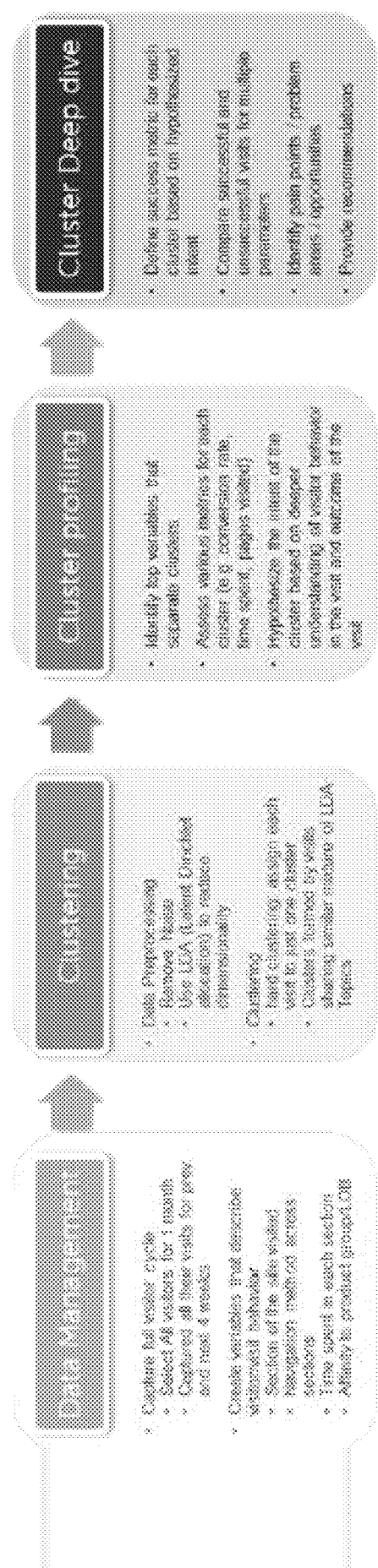
FIG. 3 shows a flow chart of a website customization operation.

FIG. 3 shows a flow chart of a website customization operation 300. In various embodiments, the website customization operation 300 includes one or more of a data management operation, a clustering operation, a cluster profiling operation and a cluster deep dive operation.

More specifically, at step 310, the website customization operation performs a data management operation. The data management operation includes capturing information regarding a full visitor cycle to a website. For example, the data management operation might select all visitors to a website for one month and capture information regarding all visits to the website and the results of these visits. The data management operation also creates variables that describe the visitor and visit behavior. These variables can include indications of the sections of the website that were visited. Navigation methods across section, time spend in each section and/or affinity to a particular product group and/or line of business.

At step 320, the website customization operation performs a clustering operation. The clustering operation includes data preprocessing as well as clustering. When performing the data preprocessing, the clustering operation removes noise (e.g., data that is not applicable to the clustering). When performing the clustering, the clustering operation assigns each visit to a cluster or clusters. In certain embodiments, the clustering comprises hard clustering where each visit is assigned to only one cluster. In certain embodiments, clusters are formed by visits sharing a similar mixture of LDA topics.

At step 330, the website customization operation performs a cluster profiling operation. The cluster profile operation identifies top variables that separate clusters. The cluster profiling operation accesses various metrics for each cluster. For example, the metrics might include one or more of conversion rate, time spent on a particular page or region of a page, and/or pages visited. The cluster profiling operation hypothesizes an intent of a cluster based upon a deeper understanding of visitor behavior in the visit and the outcome of the visit.

At step 340, the website customization operation performs a cluster deep dive operation. The cluster deep dive operation defines one or more success metrics for each cluster based on a hypothesized intent. The cluster deep dive operation compares successful and unsuccessful visits for multiple parameters. The cluster deep dive operation identifies points of the web site which present potential issues to a successful visit, areas of the website which present potential issues and opportunities for a successful visit presented by the website.

Figure 4:
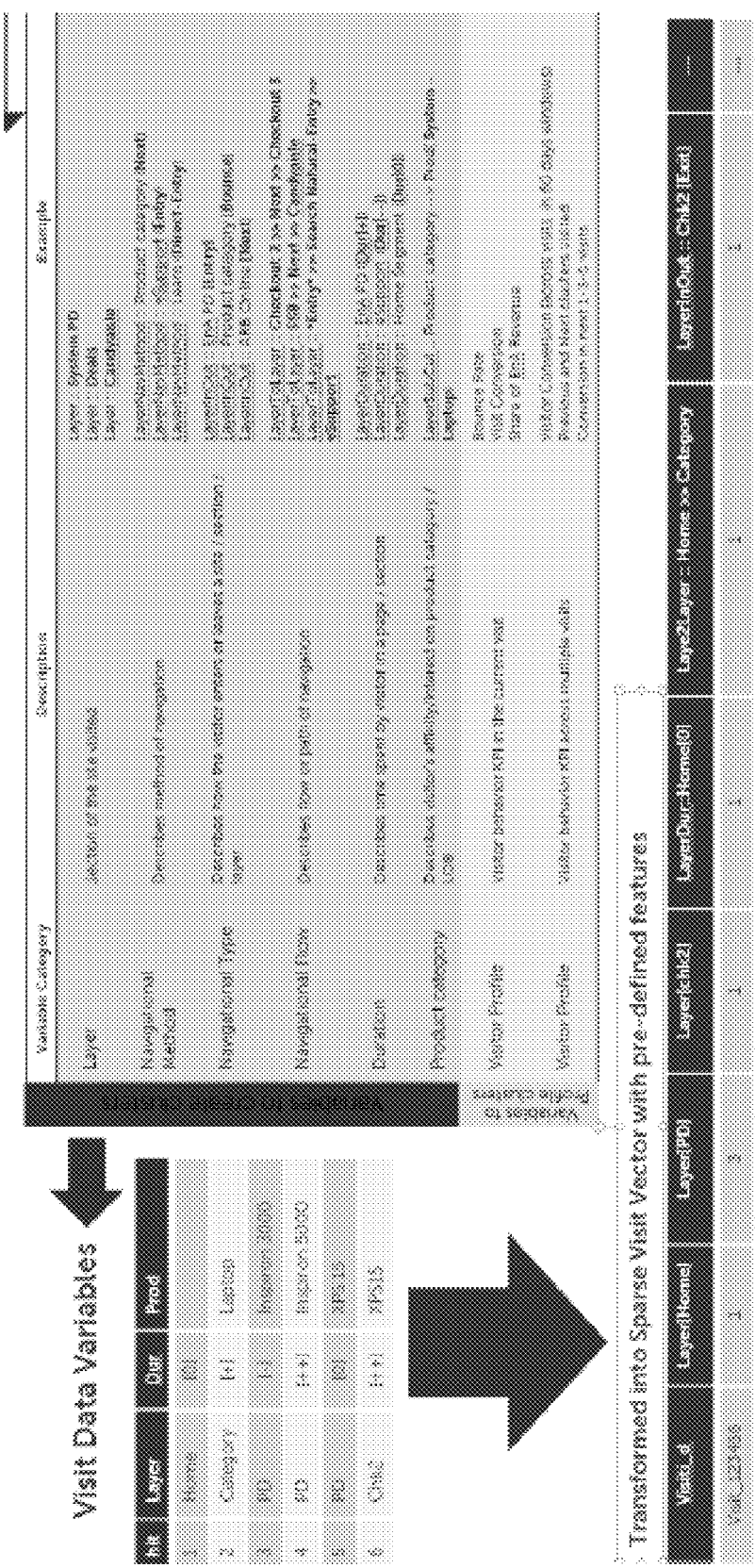
FIG. 4 shows a block diagram of a variable transformation operation.

FIG. 4 shows a block diagram of a variable transformation operation. In certain embodiments, the website customization operation defines, obtains and transforms a broad set of variables to profile and describe visitor intents. More specifically, the variable transformation operation obtains a plurality of variables from a website visit at step 410. The variable transformation operation then parses the obtained variables at step 420. Next, at step 430, the variable transformation operation transforms the parsed variables into a sparse visit vector having predefined features.

In certain embodiments, the variables obtained from a website visit during step 410 include raw input variables. In certain embodiments, the raw input variables include visit level variables which are defined to help identify customer intent. In certain embodiments, the information regarding user interactions includes the raw input variables. In certain embodiments, the variables include one or more of layer variables, navigational method variables, navigational type variables, navigational flow variables, duration variables, product category variables and visitor profile variables. In certain embodiments, layer variables, navigational method variables, navigational type variables, navigational flow variables, duration variables, product category variables are used to create intent clusters. In certain embodiments, the visitor profile variables are used to create profile clusters. In certain embodiments, the variables take into account domain knowledge when being defined.

The layer variables identify a section of a website that is visited. The navigational method variables describe a method of navigation within the website. The navigational type variables describe how a visitor enters and/or leaves a site, section and/or layer of the website. The navigational flow variables describe a flow or path of navigation. The duration variables describe time spent by a visitor in a page and/or section. The product category variables describe a visitor's affinity and/o interest on a product category and/or line of business. The visitor profile variables provide information regarding visitor behavior key performance indicators (KPIs) in a current visit and information regarding visitor behavior key performance indicators across a plurality of visits.

When the obtained variables are parsed, the layer variables, navigational method variables, navigational type variables, navigational flow variables, duration variables, may each include one or more variables. Layer variables indicate the sections of the website used, and examples of those sections are Product Description (PD) pages, Product Category pages, deals pages, checkout pages. Navigation flow variables indicate how users navigate across various pages and sections. Example of such navigation flow variables are "LayerToLayer::Deals>>Next>>Checkout1" which means user moved from deals pages to first page of checkout section.

When the parsed variables are transformed into a sparse visit vector having predefined features, each visit is identified by a visit identifier. Additionally, each visit is stored as a sparse visit vector where the variables are stored as non-negative scalar numbers within the sparse visit vector.

Figure 6:
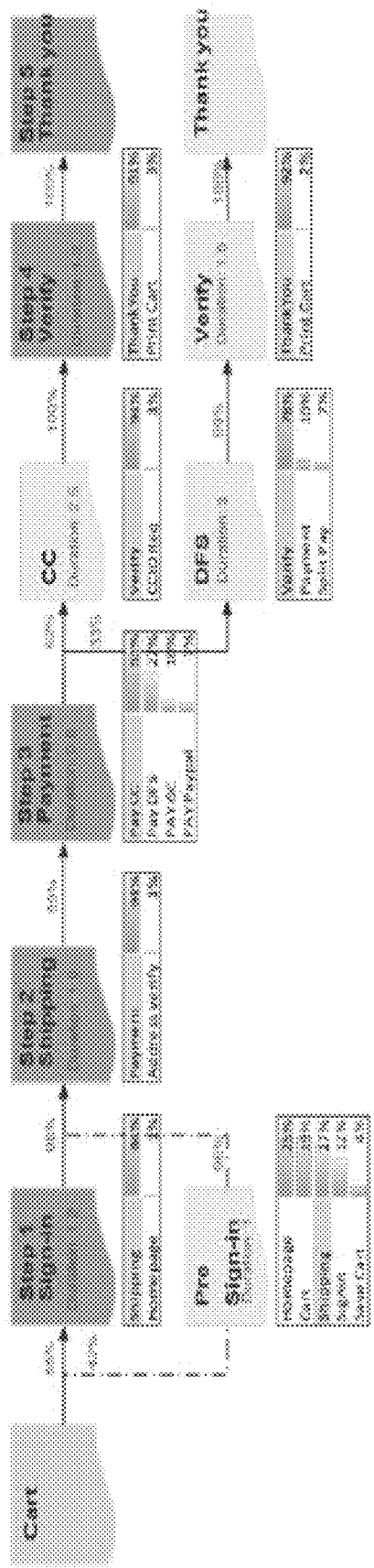
FIG. 6 shows a block diagram representation of an example golden journey which represents a purchase intent cluster.
Figure 7:
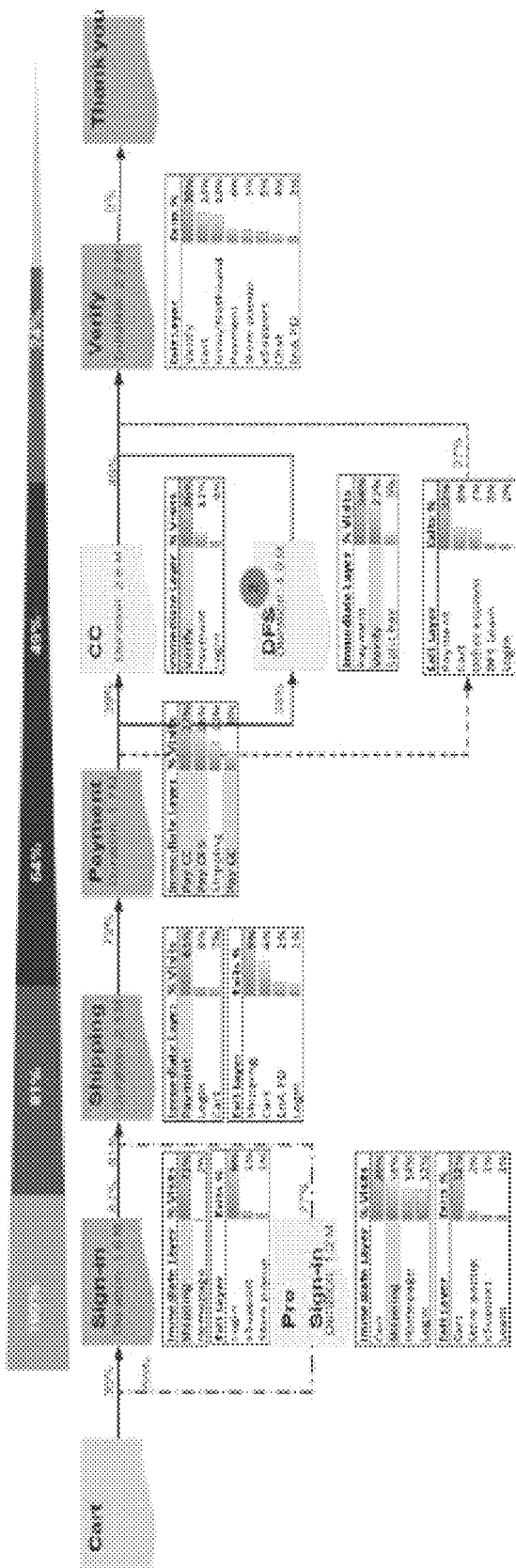
FIG. 7 shows a block diagram representation of an example unsuccessful journey.

FIG. 6 shows a block diagram representation of an example golden journey which represents a purchase intent cluster. FIG. 7 shows a block diagram representation of an example un-successful journey. The website customization operation performs an analysis operation between the successful journey and the unsuccessful journey to identify which customizations should be applied to a website for a particular identified intent.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in any suitable programming language that supports machine learning such as R, Python, Java, C++ or the like or even using statistical software products such as SAS, Statistica, MATLAB or SPSS. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a website customization operation, comprising:
    monitoring access to a website by a user across a plurality of visits to the website;
    identifying an intent of a user for each of the plurality of visits to the website, the identifying the intent of the user comprising performing a machine learning operation, the machine learning operation comprising performing a profiling operation, an intent identification operation and an analysis operation, the profiling operation providing profiling characteristics of each of a plurality of identified groups, the intent identification operation hypothesizing an intent based on the profiling characteristics, the analysis operation analyzing an intent cluster of an identified group and generating recommendations based upon intents associated with the identified group; and,
    modifying the website based upon the intent of the user.

2. The method of claim 1, wherein:
    the identifying the intent of the user for each of the plurality of visits to the website comprises performing a term frequency-inverse document frequency TF/IDF transformation operation, the TF/IDF transformation operation discounting an importance of frequently occurring feature values.

3. The method of claim 1, further comprising:
    performing a topic selection operation, the topic selection operation selecting a number of Latent Dirichlet Analysis (LDA) topics based on minimizing perplexity on a held out set.

4. The method of claim 3, further comprising:
    performing a clustering operation, the clustering operation creating clusters of latent variables, the clusters of latent variables identifying groups of visits with similar behavior.

5. The method of claim 4, wherein:
    the analysis operation identifies intents by profiling clusters, the profiling clusters analyzing characteristics and attributes of the clusters.

6. The method of claim 1, wherein:
    the modifying the website accounts for needs and preferences of visitors to the website of a particular intent.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        monitoring access to a website by a user across a plurality of visits to the website;
        identifying an intent of a user for each of the plurality of visits to the website, the identifying the intent of the user comprising performing a machine learning operation, the machine learning operation comprising performing a profiling operation, an intent identification operation and an analysis operation, the profiling operation providing profiling characteristics of each of a plurality of identified groups, the intent identification operation hypothesizing an intent based on the profiling characteristics, the analysis operation analyzing an intent cluster of an identified group and generating recommendations based upon intents associated with the identified group; and,
        modifying the website based upon the intent of the user.

8. The system of claim 7, wherein:
the identifying the intent of the user for each of the plurality of visits to the website comprises performing a term frequency-inverse document frequency TF/IDF transformation operation, the TF/IDF transformation operation discounting an importance of frequently occurring feature values.

9. The system of claim 7, wherein the instructions executable by the processor are further configured for:
performing a topic selection operation, the topic selection operation selecting a number of Latent Dirichlet Analysis (LDA) topics based on minimizing perplexity on a held out set.

10. The system of claim 9, wherein the instructions executable by the processor are further configured for:
performing a clustering operation, the clustering operation creating clusters of latent variables, the clusters of latent variables identifying groups of visits with similar behavior.

11. The system of claim 7, wherein:
the analysis operation identifies intent by profiling clusters, the profiling clusters analyzing characteristics and attributes of the clusters.

12. The system of claim 7, wherein:
the modifying the website accounts for needs and preferences of visitors to the website of the particular intent.

13. A non-transitory, computer-readable storage medium embodying computer program code, the computer program code comprising computer executable instructions configured for:
monitoring access to a website by a user across a plurality of visits to the website;
identifying an intent of a user for each of the plurality of visits to the website, the identifying the intent of the user comprising performing a machine learning operation, the machine learning operation comprising performing a profiling operation, an intent identification operation and an analysis operation, the profiling operation providing profiling characteristics of each of a plurality of identified groups, the intent identification operation hypothesizing an intent based on the profiling characteristics, the analysis operation analyzing an intent cluster of an identified group and generating recommendations based upon intents associated with the identified group; and,
modifying the website based upon the intent of the user.

14. The non-transitory, computer-readable storage medium of claim 13, wherein:
the identifying the intent of the user for each of the plurality of visits to the website comprises performing a term frequency-inverse document frequency TF/IDF transformation operation, the TF/IDF transformation operation discounting an importance of frequently occurring feature values.

15. The non-transitory, computer-readable storage medium of claim 13, wherein the computer executable instructions are further configured for:
performing a topic selection operation, the topic selection operation selecting a number of Latent Dirichlet Analysis (LDA) topics based on minimizing perplexity on a held out set.

16. The non-transitory, computer-readable storage medium of claim 15, wherein the computer executable instructions are further configured for:
performing a clustering operation, the clustering operation creating clusters of latent variables, the clusters of latent variables identifying groups of visits with similar behavior.

17. The non-transitory, computer-readable storage medium of claim 13, wherein:
the analysis operation identifies intent by profiling clusters, the profiling clusters analyzing characteristics and attributes of the clusters.

18. The non-transitory, computer-readable storage medium of claim 13, wherein:
the modifying the website accounts for needs and preferences of visitors to the website of the particular intent.

* * * * *